US 8,827,333 B2

(12) United States Patent
Ota et al.

(10) Patent No.: US 8,827,333 B2
(45) Date of Patent: Sep. 9, 2014

(54) VEHICLE BUMPER STRUCTURE

(71) Applicant: Fuji Jukogyo Kabushiki Kaisha, Tokyo (JP)

(72) Inventors: Kazuhiro Ota, Tokyo (JP); Yoshiyuki Hashimoto, Tokyo (JP); Kentaro Yamamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/724,066

(22) Filed: Dec. 21, 2012

(65) Prior Publication Data
US 2013/0175812 A1 Jul. 11, 2013

(30) Foreign Application Priority Data

Jan. 6, 2012 (JP) ................................. 2012-001187

(51) Int. Cl.
*B60R 19/34* (2006.01)
*B60R 19/14* (2006.01)
*B60R 19/12* (2006.01)

(52) U.S. Cl.
CPC ................. *B60R 19/34* (2013.01); *B60R 19/14* (2013.01); *B60R 19/12* (2013.01)
USPC .......................................... 293/102; 293/133

(58) Field of Classification Search
USPC ............ 293/102, 120, 132, 133; 296/30, 198, 296/193.09, 187.09, 187.04
See application file for complete search history.

(56) References Cited

U.S. PATENT DOCUMENTS

| 6,997,490 | B2 * | 2/2006 | Evans et al. .................... 293/120 |
| 7,481,484 | B2 * | 1/2009 | Hirano ...................... 296/187.04 |
| 7,686,358 | B2 * | 3/2010 | Takahashi et al. ............ 293/102 |
| 7,699,383 | B2 * | 4/2010 | Fukukawa et al. ....... 296/187.04 |

FOREIGN PATENT DOCUMENTS

JP       2007-204016       8/2007

* cited by examiner

*Primary Examiner* — Joseph Pape
*Assistant Examiner* — Dana Ivey
(74) *Attorney, Agent, or Firm* — Smith, Gambrell & Russell, LLP.

(57) ABSTRACT

There is provided a vehicle bumper structure. The vehicle bumper structure includes a bumper face exposed outward from a vehicle at a front end of a vehicle body, and a load transmission member having a front end opposing a surface of the bumper face at a vehicle rear side and a rear end secured to a vehicle body structural member. The load transmission member has a groove in either of an upper portion and a lower portion thereof. The groove serves as a starting point for bending the load transmission member in response to a compressive load in the lengthwise direction of the vehicle.

7 Claims, 7 Drawing Sheets

VEHICLE BUMPER STRUCTURE

CROSS-REFERENCES TO RELATED APPLICATIONS

The present application claims priority from Japanese Patent Application No. 2012-001187 filed on Jan. 6, 2012, the entire contents of which are hereby incorporated by reference.

BACKGROUND OF THE INVENTION

1. Field of the Invention

The present invention relates to a bumper structure for a vehicle such as an automobile and more particularly relates to a vehicle bumper structure that can enhance a safety performance for protection of pedestrians.

2. Description of the Related Art

A bumper provided on a front end of a vehicle includes an energy absorption (EA) member inside a bumper face that is designed to be a part of the exterior of a vehicle. The EA member receives a compressive load from the bumper face upon a collision, transmits the load to a vehicle main body and has an effect of absorbing an impact.

As a technology concerning such a vehicle bumper structure, for example, Japanese Unexamined Patent Application Publication No. 2007-204016 has disclosed energy absorption members that are individually disposed inside an upper portion (a main body) and a lower portion (an air dam) of a bumper face.

In order to enhance a safety performance for protection of pedestrians, there is a known effective measure that has an energy absorption member receive a load from a pedestrian's leg at a position as low as possible and tip the pedestrian over to turn an upper part of the leg toward a rear side of a vehicle and to flip the pedestrian up onto the hood.

However, the energy absorption member does not always receive the load from the pedestrian's leg at an ideal height on account of the height of the vehicle or the design of the vehicle. In particular, in the case of a vehicle such as a sport utility vehicle (SUV) having a larger height than a common passenger car, the position at which a load is received becomes higher inevitably.

Also, in the case where the load is received at a plurality of positions spaced in the vertical direction, it is preferable to increase the vertical span so as to distribute the load against the leg, thereby preventing a pressure from becoming excessive.

However, there may be a case where the EA member may not be able to be disposed in an upper portion of the bumper at a sufficiently high location due to constraints of design or the like of the vehicle.

SUMMARY OF THE INVENTION

In view of the above problems, it is an object of the present invention to provide a vehicle bumper structure that can enhance flexibility with which a bumper height is set for receiving a load in the case of a collision between a vehicle and a pedestrian.

An aspect of the present invention provides a vehicle bumper structure including: a bumper face exposed outward from a vehicle at a front end of a vehicle body; and a load transmission member having a front end opposing a surface of the bumper face at a vehicle rear side and a rear end secured to a vehicle body structural member. The load transmission member has a groove in an upper portion or a lower portion thereof, the groove serving as a starting point for bending the load transmission member in response to a compressive load in the lengthwise direction of the vehicle.

According to the aspect, since the compressive load in the case of a collision bends the load transmission member to turn the front end of the load transmission member in either one of the upward and downward directions, the front end can receive the load from the pedestrian's leg at a position higher or lower than a position at which the load transmission member is located in a normal state when no collision occurs.

Consequently, since the load transmission member located in a lower portion of the bumper receives the load at a lower position so that the load transmission member can knock the pedestrian's leg up, it is possible to reduce the degree of damage to the pedestrian. Alternatively, since the load transmission member located in an upper portion of the bumper receives the load at a higher position so that a vertical span for receiving the load can be widened, it is possible to distribute the load applied to the pedestrian's leg.

Preferably, the bumper face includes an air dam at a lower end thereof. The load transmission member is disposed inside the air dam and have the groove in the lower portion of the load transmission member.

According to this, even if a vehicle is, for example, an SUV with a larger vehicle height, the load transmission member can receive the load at a lower position of the pedestrian's leg, thereby enhancing the safety performance in order to protect pedestrians.

Preferably, the width of the groove decreases continuously from a lower portion of the groove to an upper portion of the groove. There is a rotary center R near the upper end of the groove, the rotary center R serving as a fulcrum when the load transmission member is bent.

According to this, since the rotary center R can be set at a given position when the load transmission member is bent, it is possible to enhance reproducibility in bending when a collision occurs, thereby stabilizing the safety performance.

Preferably, the load transmission member has a front end plate at a position lower than the rotary center R, the front end plate receiving an input from the bumper face.

According to this, the input from the front end plate results in the load transmission member being reliably bent in a desired direction.

Preferably, the load transmission member is disposed near an upper edge of the bumper face and inside the bumper face. The load transmission member has the groove in the upper portion thereof.

According to this, it is possible to reduce the degree of damage to the pedestrian's leg by distributing the load-transmitting positions for the leg.

Preferably, a strength of the load transmission member against a compressive load in the lengthwise direction is set to be lower in an intermediate area between the front end and the groove than a strength of the front end and a strength of a peripheral portion around the groove.

According to this, since the front end and the peripheral portion around the groove of the load transmission member have a strong structure, it is possible to absorb an impact by compressively breaking the intermediate portion of the member while reliably bending the member.

Preferably, the bumper face includes a pushing portion to push a part of the load transmission member upon a collision so as to generate a moment in a direction in which the load transmission member is bent.

According to this, since the input from the bumper face can apply the bending moment to the load transmission member, it is possible to more reliably obtain the effect described above.

DESCRIPTION OF THE PREFERRED EMBODIMENTS

Embodiments of the present invention provide a vehicle bumper structure that can enhance the flexibility with which a bumper height is set for receiving a load in the case of a collision between a vehicle and a pedestrian. According to the embodiments, an energy absorption (EA) bracket located inside a bumper face has a V-shaped groove in a lower portion or an upper portion thereof, the EA bracket is bent so that the groove becomes a starting point in response to an input from a front end upon a collision, and the front end is displaced in a vertical direction.

First Embodiment

First Embodiment of a vehicle bumper structure according to the present invention will be described below.

The vehicle bumper structure in First Embodiment is provided on a vehicle front end of an automobile such as an SUV type passenger car having a larger vehicle height than a usual passenger car.

Figure 1:
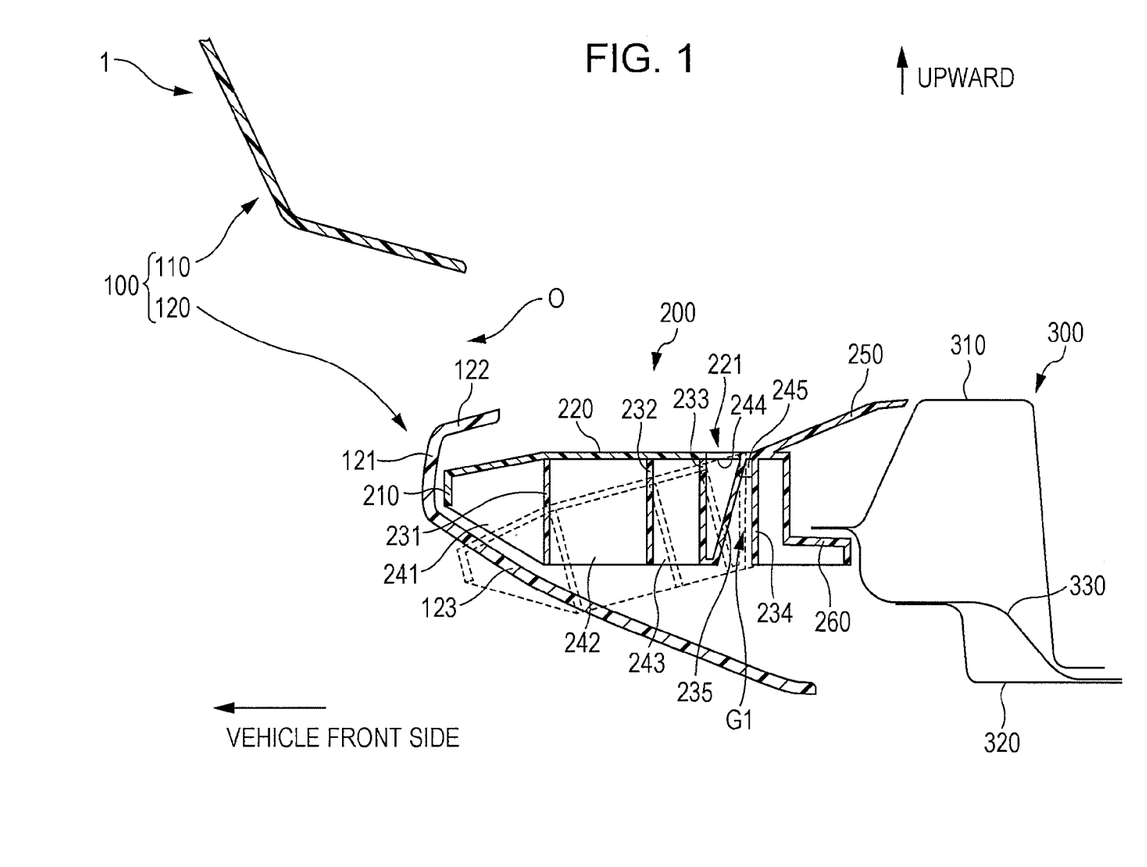
FIG. 1 is a sectional view of a vehicle bumper structure according to First Embodiment of the present invention.

FIG. 1 is a sectional view of the vehicle bumper structure according to First Embodiment. The sectional view is taken from a vertical plane at a center between the right and left sides of the vehicle (ditto for FIG. 2 to FIG. 7 mentioned later).

In the drawings, the energy absorption bracket in a collision state (after deformation) is shown by broken lines. However, in order to simplify the drawings, reference numerals are given to only the positions and elements of the energy absorption bracket before the deformation.

A vehicle bumper structure 1 includes a bumper face 100 and an energy absorption (EA) bracket 200. The EA bracket 200 is secured to a radiator lower cross member 300.

The bumper face 100 includes a main body 110 and an air dam 120.

The main body 110 defines the forward end of a vehicle and is disposed adjacent to lower portions of a radiator grill and head lamps (not shown).

The air dam 120 is disposed below the main body 110 and extends substantially along the vehicle width direction.

An opening O through to take a stream of air is defined between the main body 110 and the air dam 120.

The air dam 120 includes a front plate 121, an upper plate 122, and a lower plate 123.

The front plate 121 is oriented toward a vehicle front side. The front plate 121 is positioned rearward relative to the main body 110 in the lengthwise direction of the vehicle.

The upper plate 122 is inclined upward and extends from the upper end of the front plate 121 toward the rear.

The lower plate 123 is inclined downward and extends from the lower end of the front plate 121 toward the rear.

The front end of the EA bracket 200 is disposed inside the air dam 120 of the bumper face 100. The EA bracket 200 constitutes a load transmission member that receives an input from the air dam 120 upon a collision and transmits a load to a vehicle main body (to the radiator lower cross member 300).

The EA bracket 200 is integrally formed by injection molding using a resin material such as polypropylene.

The EA bracket 200 includes a front plate 210, an upper plate 220, a first cross rib 231, a second cross rib 232, a third cross rib 233, a fourth cross rib 234, a slant cross rib 235, a first vertical rib 241, a second vertical rib 242, a third vertical rib 243, a fourth vertical rib 244, a gusset 245, an upper fixing plate 250, and a lower fixing plate 260.

The front plate 210 is a surface provided at the front end of the EA bracket 200. The front plate 210 is spaced apart from and opposed to the rear surface of the front plate 121 of the air dam 120 at the rear side in the lengthwise direction of the vehicle.

The front plate 210 is disposed substantially along the vertical direction.

The front plate 210 is disposed at the forward position of the vehicle relative to the rear ends of the upper plate 122 and the lower plate 123 of the air dam 120.

The front plate 210 serves as an input unit to receive a compressive load from the front plate 121 of the air dam 120 when a collision occurs.

The upper plate 220 extends from the upper end of the front plate 210 toward the rear side of the vehicle.

The upper plate 220 slants upward from the upper end of the front plate 210 to the upper end of the first cross rib 231 in the lengthwise direction of the vehicle while the upper plate 220 extends substantially horizontally from the first cross rib 231 toward the rear side of the vehicle.

The first cross rib 231 is disposed further toward the rear than the front plate 210. The first cross rib 231 has a surface such that the first cross rib 231 is spaced apart from and opposes the front plate 210 and extends substantially along the vertical direction.

The first cross rib 231 extends downward from the bottom surface of the upper plate 220.

The upper end of the first cross rib 231 is disposed at a position higher than the upper end of the front plate 210.

The lower end of the first cross rib 231 is disposed at a position lower than the lower end of the front plate 210.

The second cross rib 232 is disposed further toward the rear than the first cross rib 231. The second cross rib 232 has a surface such that the second cross rib 232 is spaced apart from and opposes the first cross rib 231 and extends substantially along the vertical direction.

The second cross rib 232 extends downward from the bottom surface of the upper plate 220.

The upper and lower ends of the second cross rib 232 are respectively disposed at the same height as the upper and lower ends of the first cross rib 231.

The third cross rib 233 is disposed further toward the rear than the second cross rib 232. The third cross rib 233 has a surface such that the third cross rib 233 is spaced apart from and opposes the second cross rib 232 and extends substantially along the vertical direction.

The third cross rib 233 extends downward from the bottom surface of the upper plate 220.

The upper and lower ends of the third cross rib 233 are respectively disposed at the same height as the upper and lower ends of the first cross rib 231.

The distance between the second cross rib 232 and the third cross rib 233 (the distance in the lengthwise direction) is set to be shorter than the distance between the first cross rib 231 and the second cross rib 232.

The fracture strength of the EA bracket 200 against the compressive load in the lengthwise direction of the vehicle in an area (intermediate area) between the second cross rib 232 and the third cross rib 233 is set to be lower than the fracture strength in an area located further to the front than the second cross rib 232 and the fracture strength in an area located further to the rear than the third cross rib 233.

Such a difference in strength can be set by adjusting, for example, the disposition and plate thickness of each cross rib.

The fourth cross rib 234 is disposed further toward the rear than the third cross rib 233. The fourth cross rib 234 has a surface and is spaced apart from the third cross rib 233 such that the slant cross rib 235 is disposed between the third cross rib 233 and the fourth cross rib 234. The fourth cross rib 234 extends substantially along the vertical direction.

The fourth cross rib 234 extends downward from the bottom surface of the upper plate 220.

The upper and lower ends of the fourth cross rib 234 are respectively disposed at the same height as the upper and lower ends of the first cross rib 231.

The upper plate 220 is not provided between the third cross rib 233 and the fourth cross rib 234 in order to allow releasing of a mold. An opening 221 is defined between the ribs 233 and 234.

The slant cross rib 235 is connects the lower end of the third cross rib 233 and the upper end of the fourth cross rib 234. The slant cross rib 235 has a surface such that the slant cross rib 235 is inclined with respect to the other cross ribs.

A groove G1 is defined between the slant cross rib 235 and the fourth cross rib 234 so that the groove G1 forms a substantially reversed V-shape.

A first vertical rib 241 has a surface extending substantially along the vertical direction and the lengthwise direction of the vehicle. The first vertical rib 241 is disposed so as to connect the front plate 210 and the first cross rib 231.

The lower end of the first vertical rib 241 extends substantially along a slant line connecting the lower end of the front plate 210 and the lower end of the first cross rib 231.

A second vertical rib 242 has a surface extending substantially along the vertical direction and the lengthwise direction of the vehicle. The second vertical rib 242 is disposed so as to connect the first cross rib 231 and the second cross rib 232.

The lower end of the second vertical rib 242 extends substantially along a horizontal line connecting the lower end of the first cross rib 231 and the lower end of the second cross rib 232.

A third vertical rib 243 has a surface extending substantially along the vertical direction and the lengthwise direction of the vehicle. The third vertical rib 243 is disposed so as to connect the second cross rib 232 and the third cross rib 233.

The lower end of the third vertical rib 243 extends substantially along a horizontal line connecting the lower end of the second cross rib 232 and the lower end of the third cross rib 233.

A fourth vertical rib 244 has a surface extending substantially along the vertical direction and the lengthwise direction of the vehicle. The fourth vertical rib 244 is disposed so as to connect the third cross rib 233 and the slant cross rib 235.

The upper end of the fourth vertical rib 244 extends substantially along a horizontal line connecting the upper end of the third cross rib 233 and the upper end of the slant cross rib 235.

The gusset 245 is provided at the upper end of the groove G1 (at the bottom of the groove) formed between the slant cross rib 235 and the fourth cross rib 234 and has a surface interconnecting the slant cross rib 235 and the fourth cross rib 234.

The upper fixing plate 250 secures the EA bracket 200 to an upper portion of the radiator lower cross member 300.

The upper fixing plate 250 extends from the upper plate 220 immediately above the fourth cross rib 234 toward the rear and slants upward.

The lower fixing plate 260 secures the EA bracket 200 to a lower portion of the radiator lower cross member 300.

The lower fixing plate 260 is formed into a box-shape that projects backward from the fourth cross rib 234 and is open at the bottom. The lower fixing plate 260 has a step-like portion on its upper portion at the rear end.

The radiator lower cross member 300 is a structural member of the vehicle body and supports a lower end of a radiator core (not shown). The radiator lower cross member 300 is formed into a beam-shape that extends substantially along the width direction of the vehicle.

The radiator lower cross member 300 is constructed by joining a pair of split upper and lower panels 310 and 320 to each other so as to have a closed section.

The radiator lower cross member 300 has a reinforcement 330 that is welded inside the member 300 to be disposed between the upper panel 310 and the lower panel 320.

The joint between the upper and lower panels 310 and 320 at the vehicle front side projects like a flange toward the vehicle front side. The respective panels are joined to each other at this joint by spot welding.

A lower part of the step-like portion (rearward projecting area) of the lower fixing plate 260 of the EA bracket 200 is disposed below and secured to the lower side of the joint.

Next, an operation of the vehicle bumper structure 1 in First Embodiment in the case of a collision between a pedestrian and a vehicle will be described below.

When a pedestrian's leg is hit by the front plate 121 of the air dam 120 in the bumper face 100, the front plate 121 shifts to the vehicle backward side relative to the radiator lower cross member 300 and contacts with the front plate 210 of the EA bracket 200.

When the front plate 210 is pushed toward the rear side of the vehicle and the EA bracket 200 receives a compressive load in a direction toward the rear of the vehicle, the front end portions including the front plate 210 are bent so that the front end portions turn downward about the gusset 245 provided in the bottom of the groove G1, as shown by broken lines in FIG. 1.

In order to reliably obtain a moment that causes such a turning motion, a central part of the front plate 210 receiving an input is disposed at a position lower than the bottom of the groove G1, which is a center of rotation.

The EA bracket 200 turns until the slant cross rib 235 contacts with the fourth cross rib 234. Then, the transmission of the load will substantially begin to be transmitted to the radiator lower cross member 300.

Thus, since the position of the pedestrian's leg at which the load is received is lower than that of the front plate 210 before the collision occurs, it is possible to enhance the effect of flipping the pedestrian up by rotating the pedestrian's leg.

The EA bracket 200 can absorb an impact by compressively breaking an intermediate portion of the bracket by the load.

As described above, according to First Embodiment, it is possible to enhance a safety performance for protection of pedestrians by allowing a height, at which the EA bracket 200 receives a load due to collision with a pedestrian, to be set lower than a lower limit height of a vehicle, which is constrained by the height and design of the vehicle.

Second Embodiment

Next, Second Embodiment of the vehicle bumper structure according to the present invention will be described below.

In the following Embodiments, descriptions of positions and elements that are substantially the same as those of First Embodiment will be omitted by giving the same reference numerals to the same positions and elements, and differences will be mainly described.

Figure 2:
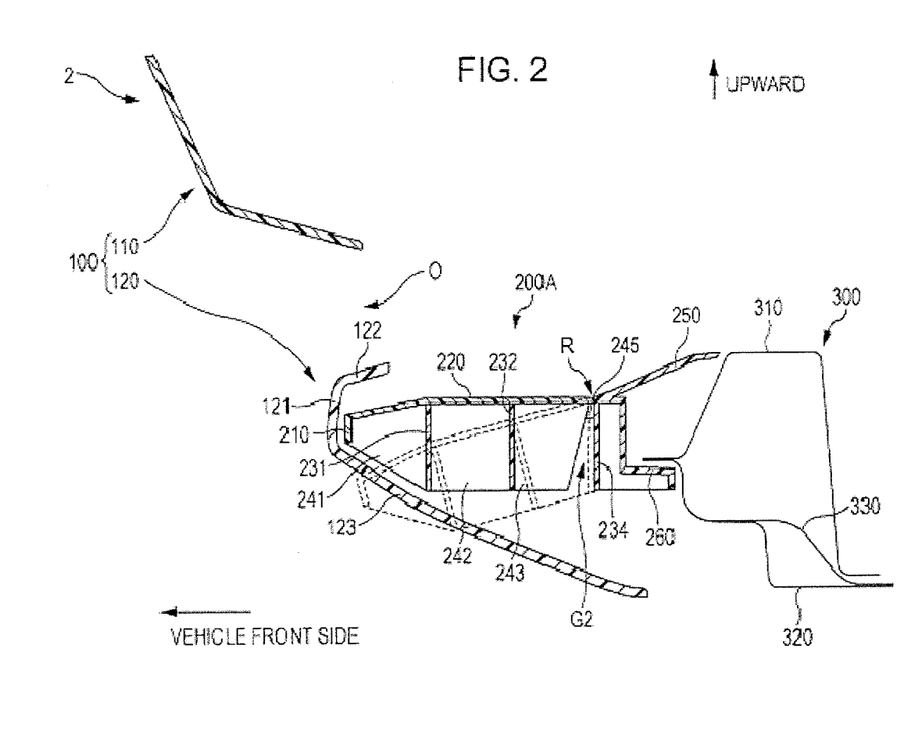
FIG. 2 is a sectional view of a vehicle bumper structure according to Second Embodiment of the present invention.

FIG. 2 is a sectional view of the vehicle bumper structure in Second Embodiment.

In an EA bracket 200A of a vehicle bumper structure 2 in Second Embodiment, the third cross rib 233, slant cross rib 235, and fourth vertical rib 244 in the EA bracket 200 in First Embodiment are omitted, and the EA bracket 200A has a groove G2 between the fourth cross rib 234 and the rear end of the third vertical rib 243 that extends rearward from the second cross rib 232.

The rear end of the third vertical rib 243 has a diagonally cut-away shape in the vertical direction so that the distance between the rear end of the third vertical rib 243 and the fourth cross rib 234 increases downward.

In Second Embodiment, the opening 221 in the upper plate 220 in First Embodiment is not provided.

The EA bracket 200A in Second Embodiment is bent until the rear end of the third vertical rib 243 hits the fourth cross rib 234 upon a collision.

Second Embodiment described above can obtain the substantially same effect as First Embodiment mentioned above.

Third Embodiment

Next, Third Embodiment of the vehicle bumper structure according to the present invention will be described below.

Figure 3:
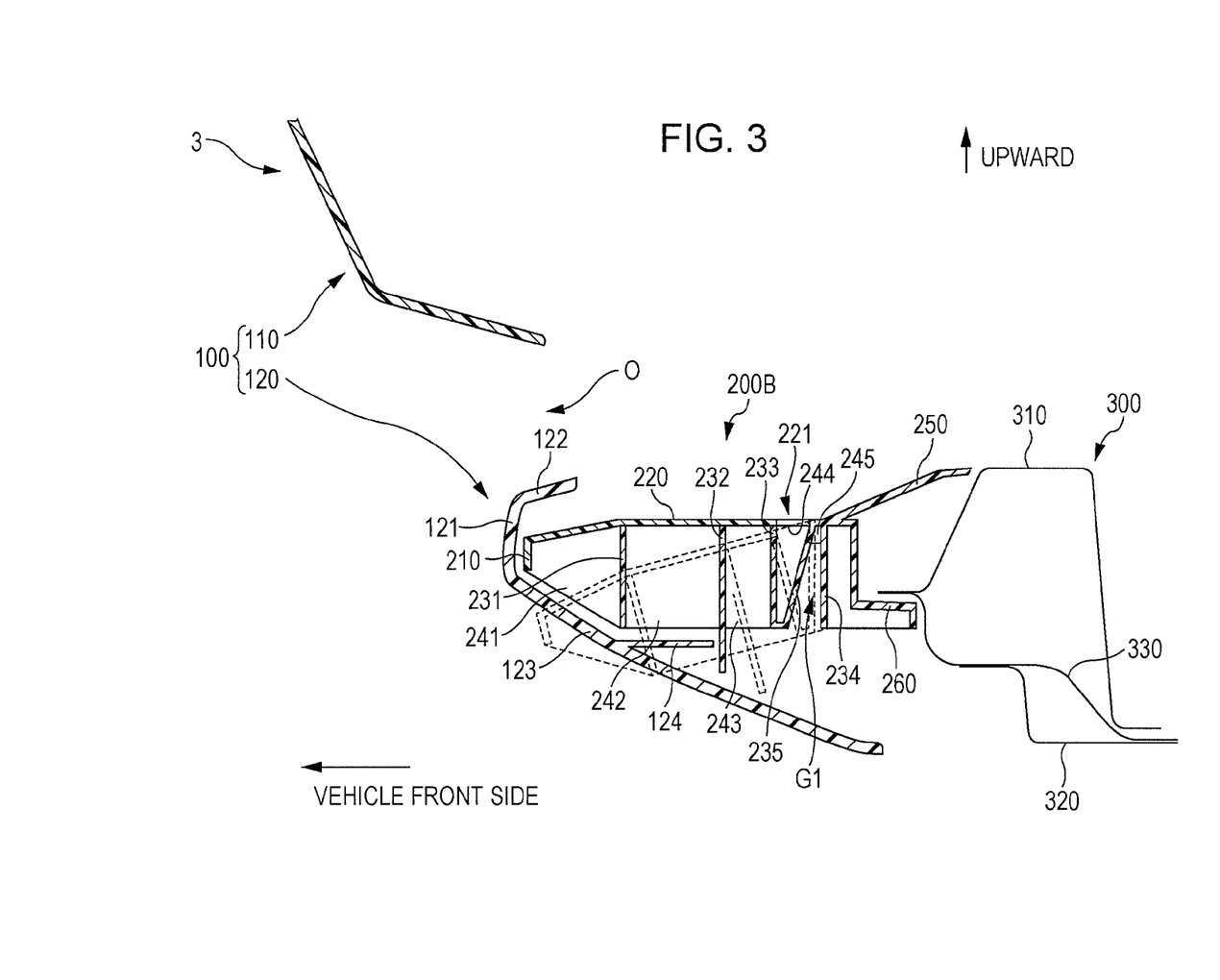
FIG. 3 is a sectional view of a vehicle bumper structure according to Third Embodiment of the present invention.

FIG. 3 is a sectional view of the vehicle bumper structure in Third Embodiment.

In an EA bracket 200B of a vehicle bumper structure 3 in Third Embodiment, the second cross rib 232 in the EA bracket 200 in First Embodiment extends downward so as to project from the bottom surface of the EA bracket 200B.

The vehicle bumper structure 3 in Third Embodiment has a projection 124 (e.g., a pushing portion) that protrudes from the lower plate 123 of the air dam 120 of the bumper face 100 to the rear side of a vehicle. A distal end of the projection 124 is spaced apart from and opposes the lower end of the second cross rib 232 in the lengthwise direction of the vehicle in a normal state when no collision occurs.

While Third Embodiment described above has the substantially same effect as First Embodiment mentioned above, it can also generate a rotary moment that causes the front end of the EA bracket 200B to turn downward and reliably bend the EA bracket 200B, since the projection 124 pushes the lower end of the second cross rib 232 to the rear side of the vehicle upon a collision.

Fourth Embodiment

Next, Fourth Embodiment of the vehicle bumper structure according to the present invention will be described below.

Figure 4:
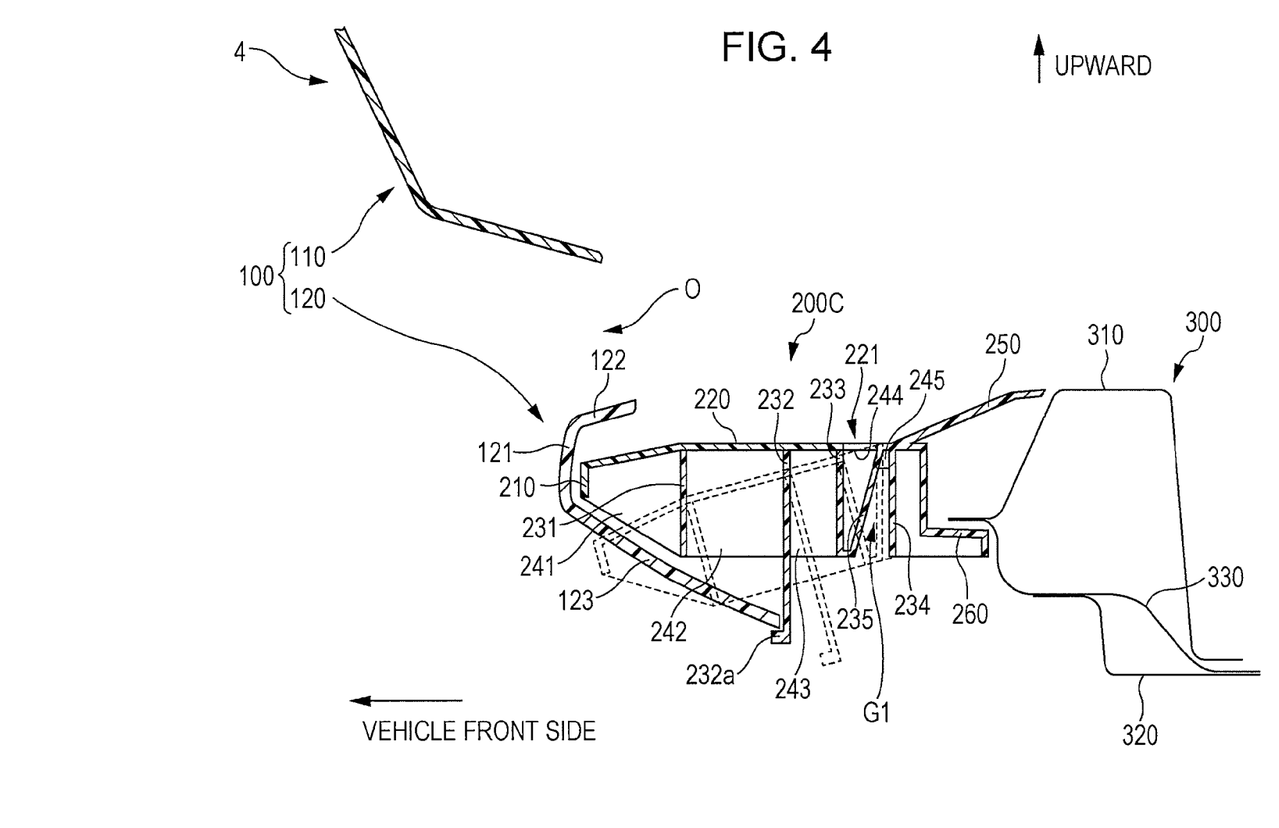
FIG. 4 is a sectional view of a vehicle bumper structure according to Fourth Embodiment of the present invention.

FIG. 4 is a sectional view of the vehicle bumper structure in Fourth Embodiment.

In an EA bracket 200C of a vehicle bumper structure 4 in Fourth Embodiment, the second cross rib 232 in the EA bracket 200 in First Embodiment extends downward so as to form an engagement end 232a that engages with the rear end of the lower plate 123 (e.g., a pushing portion) of the air dam 120 in the bumper face 100.

The engagement end 232a is a hook-like portion that projects from the extending lower end of the second cross rib 232 to the front side.

While Fourth Embodiment described above has the substantially same effect of First Embodiment mentioned above, it can also generate a rotary moment that causes the front end of the EA bracket 200C to be turned downward and reliably bend the EA bracket 200C, since the rear end of the lower plate 123 pushes the engagement end 232a of the second cross rib 232 to the rear side of the vehicle upon a collision.

Fifth Embodiment

Next, Fifth Embodiment of the vehicle bumper structure according to the present invention will be described below.

Figure 5:
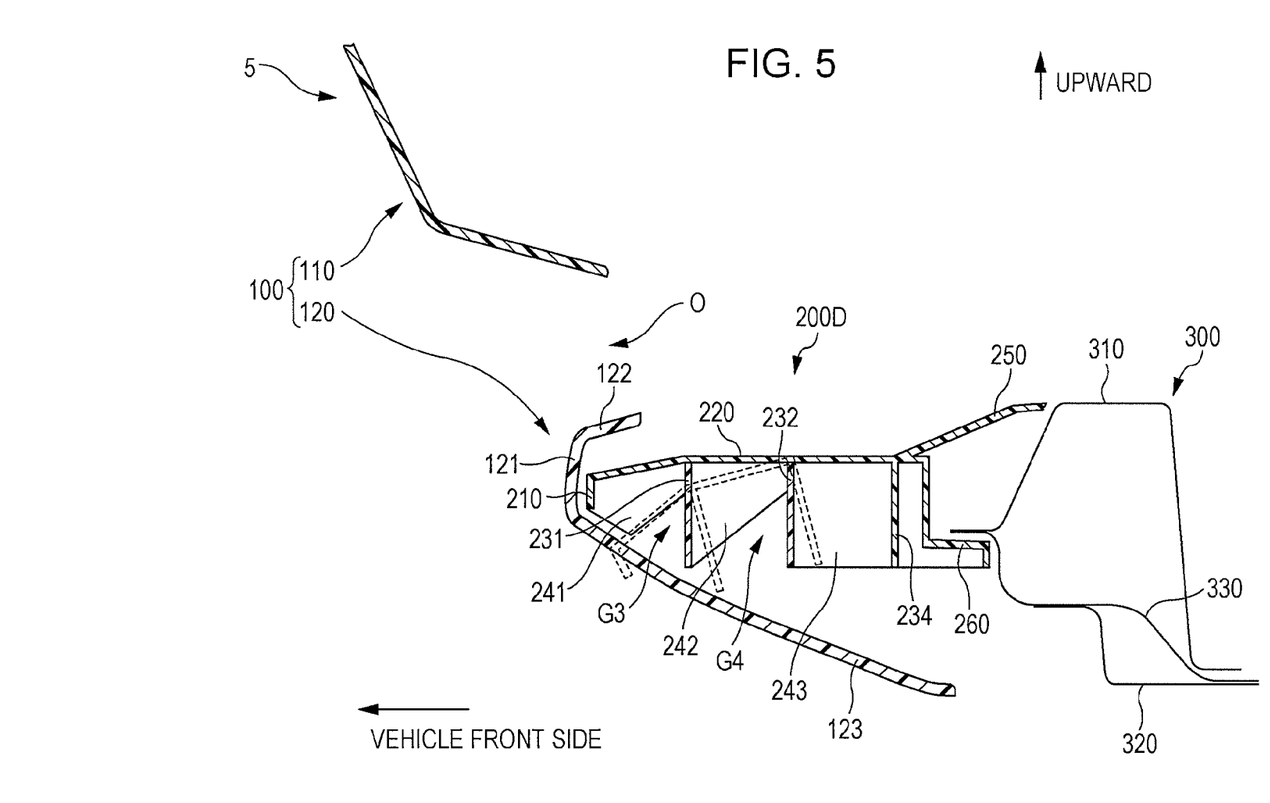
FIG. 5 is a sectional view of a vehicle bumper structure according to Fifth Embodiment of the present invention.

FIG. 5 is a sectional view of the vehicle bumper structure in Fifth Embodiment.

An EA bracket 200D of a vehicle bumper structure 5 in Fifth Embodiment has grooves G3 and G4 to be mentioned below in place of the groove G2 in the EA bracket 200A in Second Embodiment.

The groove G3 is provided between the rear end of the first vertical rib 241 and the front surface of the first cross rib 231 and has a reversed V-shape that is open at the bottom.

The groove G4 is provided between the rear end of the second vertical rib 242 and the front surface of the second cross rib 232 and has a reversed V-shape that is open at the bottom.

In Fifth Embodiment, the third vertical rib 243 connects the second cross rib 232 and the fourth cross rib 234. The third cross rib 233 and slant cross rib 235 are not provided in Fifth Embodiment, as is the case with Second Embodiment.

Since widths of the grooves G3 and G4 in Fifth Embodiment described above are reduced upon a collision and the front end of the EA bracket 200D is bent down, Fifth embodiment achieves the substantially same effect as First Embodiment.

Sixth Embodiment

Next, Sixth Embodiment of the vehicle bumper structure according to the present invention will be described below.

Figure 6:
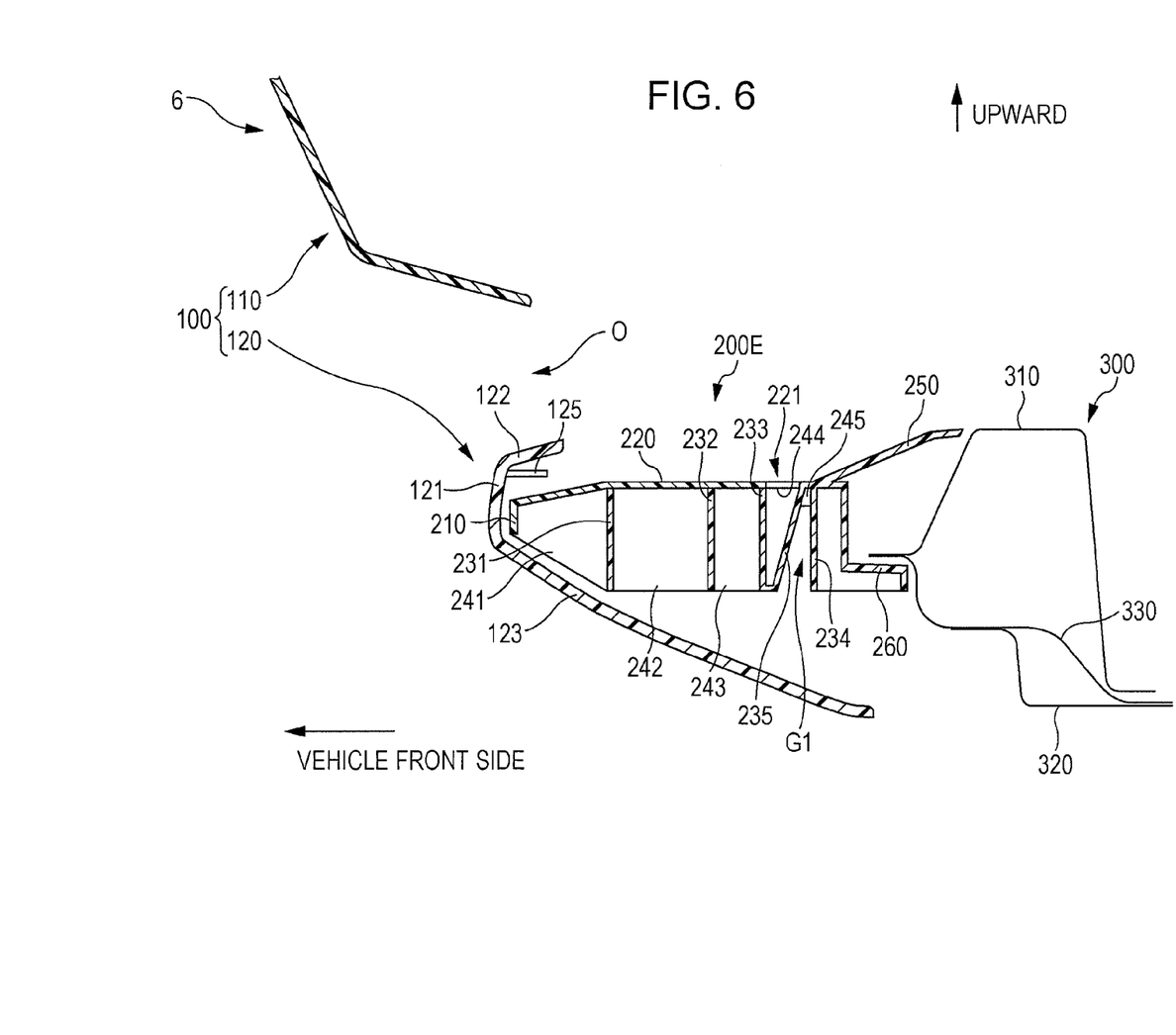
FIG. 6 is a sectional view of a vehicle bumper structure according to Sixth Embodiment of the present invention.

FIG. 6 is a sectional view of the vehicle bumper structure in Sixth Embodiment.

A vehicle bumper structure 6 in Sixth Embodiment includes an EA bracket 200E that is substantially same as the EA bracket 200 in First Embodiment.

In Sixth Embodiment, a projection 125 (e.g., a pushing portion) extends from the upper portion of the front plate 121 of the air dam 120 in the bumper face 100.

The projection 125 is spaced apart from and opposes the front end of the upper plate 220 of the EA bracket 200E in the vertical direction of the vehicle in a normal state when no collision occurs.

Upon a collision, the bumper face 100 is deformed, thereby displacing the air dam 120 downward. Accordingly, the projection 125 pushes down the upper plate 220 of the EA bracket 200E, whereby a rotary moment is generated on the front end of the EA bracket 200E in the direction of promoting the bending action.

While Sixth Embodiment described above has the substantially same effect of First Embodiment mentioned above, it can also reliably bend the EA bracket 200E, since the projection 125 generates the rotary moment on the front end of the EA bracket 200E.

Seventh Embodiment

Next, Seventh Embodiment of the vehicle bumper structure according to the present invention will be described below.

Figure 7:
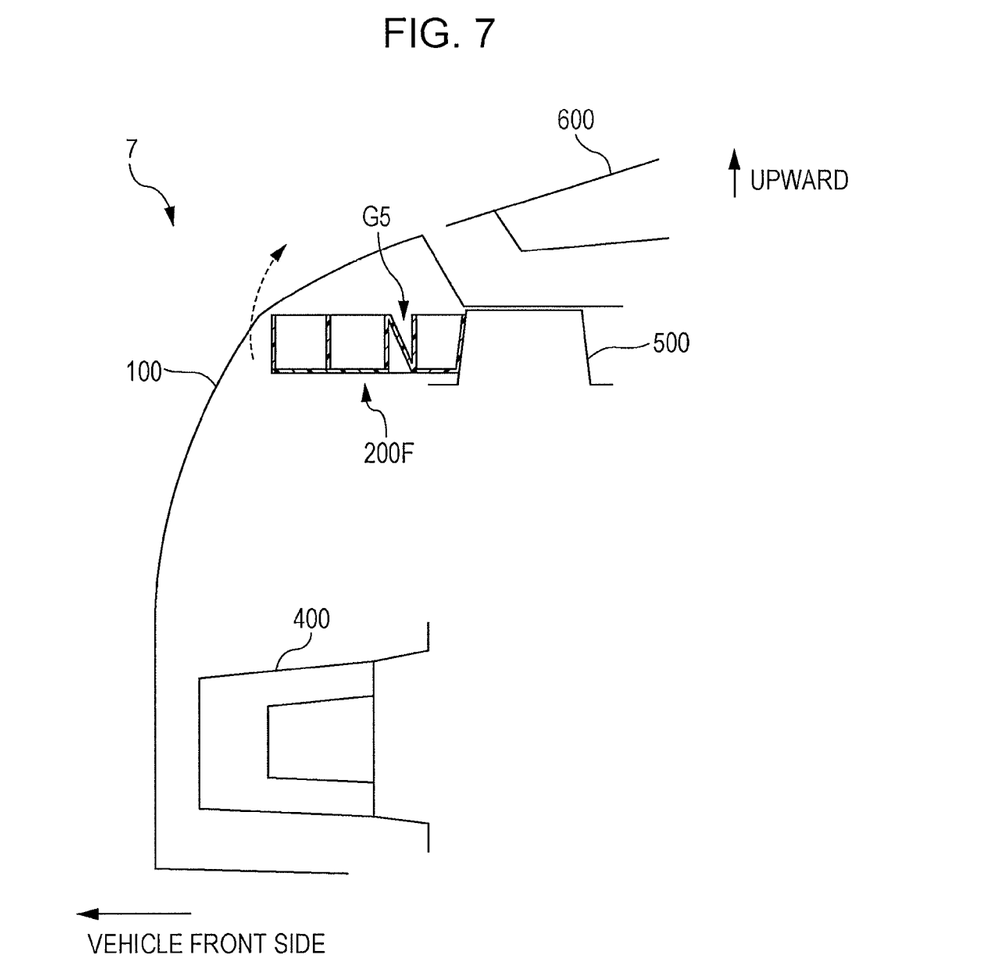
FIG. 7 is a sectional view of a vehicle bumper structure according to Seventh Embodiment of the present invention.

FIG. 7 is a sectional view of the vehicle bumper structure in Seventh Embodiment.

In a vehicle bumper structure 7 in Seventh Embodiment, an EA material 400 such as a hard urethane foam is disposed at a lower position inside the bumper face 100 while an EA bracket 200F having a groove G5 that is open upward is disposed near the upper end of the bumper face 100 and inside the face 100.

The rear end of the EA bracket 200F is fixed to a radiator upper cross member 500 that holds the upper end of the radiator core.

The front end of a hood 600 provided on an upper portion of an engine compartment is disposed above the radiator upper cross member 500.

When the vehicle hits against a pedestrian's leg, the front end of the EA bracket 200F in Seventh Embodiment is bent upward.

Consequently, the height at which the EA bracket 200F receives a load from the pedestrian's leg becomes higher than the height of the EA bracket before the collision.

Thus, the EA bracket 200F and EA material 400 increase a load-transmission span between the pedestrian's leg and the EA bracket 200F and EA material 400 in the vertical direction, thereby distributing the load and reducing the damage to the pedestrian's leg.

MODIFICATION

The present invention is not limited to Embodiments described above. The present invention permits various kinds of alterations and modifications and the alterations and modifications will fall into the technical scope of the present invention.

Shapes, constructions, materials, dispositions, or the like of the respective elements that constitute the vehicle bumper structure are not limited to those of the respective Embodiments and may be modified as appropriate.

What is claimed is:

1. A vehicle bumper structure comprising:
a bumper face exposed outward from a vehicle at a front end of a vehicle body, the bumper face including an air dam at a lower end thereof; and
a load transmission member having a front end opposing a surface of the bumper face at a vehicle rear side and a rear end secured to a vehicle body structural member, wherein
the load transmission member is disposed inside the air dam and has a groove that opens to a lower portion of the load transmission member, the groove serving as a starting point for bending the load transmission member in response to a compressive load in the lengthwise direction of the vehicle upon a collision,
a width of the groove decreases continuously from a lower portion of the groove to an upper portion of the groove, and
the groove has a rotary center near the upper end thereof, the rotary center serving as a fulcrum when the load transmission member is bent.

2. The vehicle bumper structure according to claim 1, wherein
the load transmission member has a front end plate at a position lower than the rotary center, the front end plate configured to receive a compressive load input from the bumper face upon a collision.

3. The vehicle bumper structure according to claim 1, wherein
a strength of the load transmission member against a compressive load in the lengthwise direction is lower in an intermediate area between the front end and the groove than a strength of the front end and a strength of a peripheral portion of the load transmission member around the groove.

4. The vehicle bumper structure according to claim 1, wherein
the bumper face includes a pushing portion to push a part of the load transmission member, based on a compressive load incurred upon a collision, so as to generate a moment in a direction in which the load transmission member is bent.

5. A vehicle bumper structure comprising:
a bumper face exposed outward from a vehicle at a front end of a vehicle body; and
a load transmission member having a front end opposing a surface of the bumper face at a vehicle rear side and a rear end secured to a vehicle body structural member, wherein
the load transmission member has a groove that opens to an upper portion thereof, the groove serving as a starting point for bending the load transmission member in response to a compressive load in the lengthwise direction of the vehicle upon a collision,
a width of the groove decreases continuously from an upper portion of the groove to a lower portion of the groove,
the groove has a rotary center near the lower end thereof, the rotary center serving as a fulcrum when the load transmission member is bent, and
the load transmission member is disposed near an upper edge of the bumper face and inside the bumper face.

6. The vehicle bumper structure according to claim 5, wherein
a strength of the load transmission member against a compressive load in the lengthwise direction is lower in an intermediate area between the front end and the groove than a strength of the front end and a strength of a peripheral portion of the load transmission member around the groove.

7. The vehicle bumper structure according to claim 5, wherein
the bumper face includes a pushing portion to push a part of the load transmission member, based on a compressive load incurred upon a collision, so as to generate a moment in a direction in which the load transmission member is bent.

* * * * *